June 4, 1935.  J. O. ALMEN  2,003,817
DISK SPRING GOVERNOR
Filed Feb. 21, 1934   2 Sheets-Sheet 1
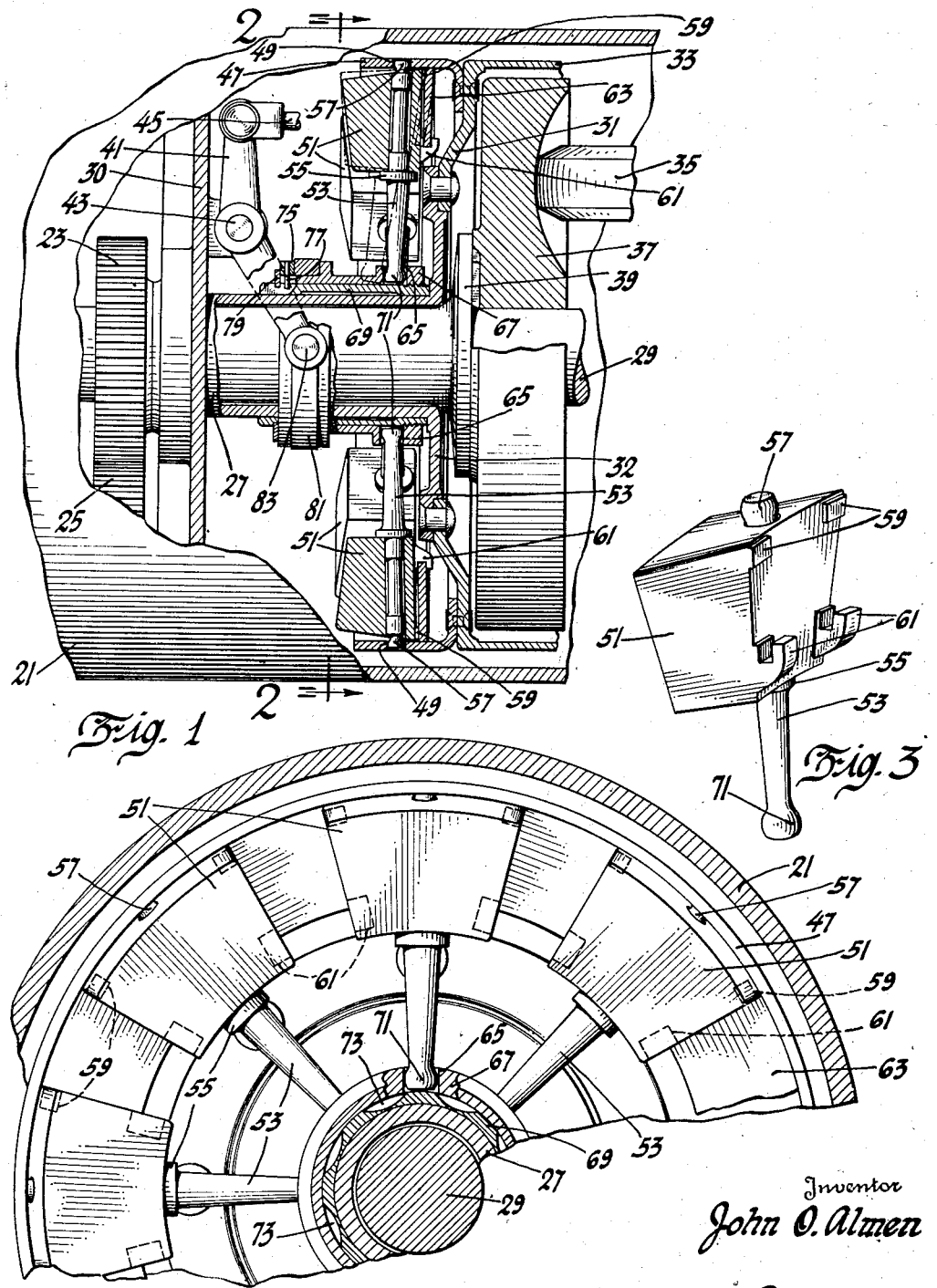
Inventor
John O. Almen
By Blackmore Spencer & Flint
Attorneys June 4, 1935. J. O. ALMEN 2,003,817
DISK SPRING GOVERNOR
Filed Feb. 21, 1934 2 Sheets-Sheet 2

Inventor
John O. Almen
By Blackmore, Spencer & Flint
Attorneys

Patented June 4, 1935

2,003,817

UNITED STATES PATENT OFFICE 2,003,817

DISK SPRING GOVERNOR

John O. Almen, Royal Oak, Mich., assignor to General Motors Corporation, Detroit, Mich., a corporation of Delaware Application February 21, 1934, Serial No. 712,308

11 Claims. (Cl. 264—15)

This invention relates to a centrifugally-operated controlling mechanism, and has been designed for use as a centrifugal governor for controlling the driving ratio of an infinitely variable change speed transmission mechanism for a motor vehicle.

Among the objects to be attained by the governor mechanism of this invention are: simplicity and compactness, economy in manufacture and service, a reduction in internal friction, equalization of the movements of weights through the control exercised upon them by the spring which restrains their movement, the opportunity for modifying the governor characteristics by simple and inexpensive modifications of its spring.

Other objects and advantages will be understood from the following description.

In the drawings:

Fig. 1 is a view, mainly in transverse section, showing my novel governor applied to an infinitely variable friction roller transmission.

Fig. 2 is a view in elevation, partly in section, as seen from line 2—2 of Fig. 1.

Fig. 3 is a perspective of a governor weight.

Figure 4:
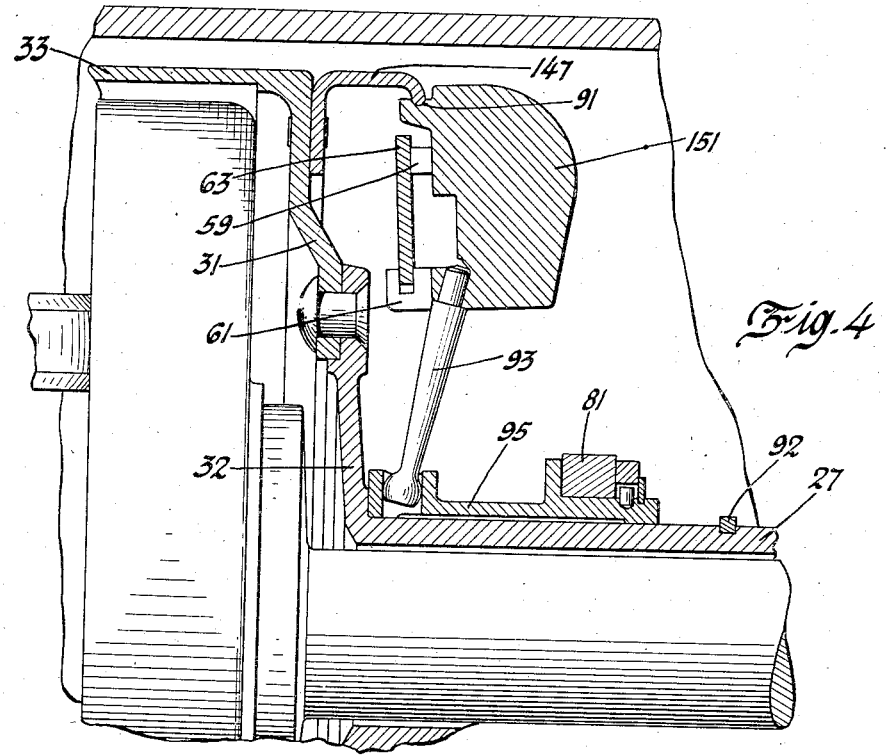
Figs. 4, 5 and 6 are sectional views of modified forms.

In Fig. 1 is illustrated a casing or housing 21. At 23, 25 are shown two gears which represent a portion of a forward and reverse gear transmission which is intended to transmit rotation to gear 23 in a direction the same as or the reverse of an engine driven shaft, not shown. No novelty is herein claimed for this gear mechanism. Gear 23 drives a tubular shaft 27 extending through a partition 30 separating the forward and reverse gear transmission from the change speed mechanism.

Tubular shaft 27 may be considered as the input shaft of the change speed transmission. At 29 is the coaxial output shaft which is, of course, to be coupled directly or indirectly to the vehicle drive wheels. To a radial flange 32 on the input shaft is secured a second radial flange 31 from which extends an axial flange or barrel 33. The axial flange is to be coupled to a driving race, not shown, which driving race frictionally engages rollers such as 35 for rotating a driven race 37 keyed or otherwise secured to flange 39 on the output shaft 29. Change speed mechanisms of this kind are known and since this invention is not concerned with the details of such a mechanism no further description is necessary. It should be noted, however, that the changes in speed are brought about by a tilting of the rollers 35 and to effect such tilting there is shown a lever 41 pivoted at 43 to the partition 30. A link 45 is pivoted to the lever and is connected by suitable means, not shown, with the roller support to change the position of the roller and therefore change the driving ratio. This invention is not concerned with the roller support nor with the kind of connections between the lever 41 and the roller support. The invention relates to the governor by which the lever 41 is rotated to change the roller axis.

To the radial flange 31 is secured in any convenient way a rim member ob. This rim 47 has spaced openings 49, there being one opening for each of several flyweights 51, one of these weights being shown in perspective in Fig. 3. Press-fitted in each weight and extending therethrough is a pin 53, the weight being located between a pin shoulder 55 and the rounded pin end 57 which is located in the rim opening 49. On the faces of the weights adjacent the flange 31 are spaced pads 59, these pads being near the radially outer parts of the weights. On the same faces adjacent the radially inner regions are spaced hooks 61. An annular metal resilient member 63 lies against pads 59 and within the hooks 61. The spacing of the pads and hooks permits a circumferential bending of the annulus therebetween.

The inner rounded ends 71 of pins 53 are received in openings 65 in a sleeve 67. This sleeve 67 is mounted to slide axially about the hollow input shaft 27. The sleeve 67 surrounds an intermediate sleeve 69. Sleeve 69 has a plurality of cam slots 73. If sleeves 67 and 69 be placed in such a position of relative rotation that the rounded ends 71 may be passed through openings 65 and into slots 73 the hooks may then be so positioned relative to the inner part of spring 63 that upon a subsequent relative rotation of the sleeves the walls of the cam slots will force the ends 71 outwardly and cause the hooks 61 to engage the spring. When so rotated the sleeves are secured from relative rotation and from relative axial movement. A ring clip 75 is placed in position on sleeve 67 and a pin 77 is entered into an opening in sleeve 69 to prevent relative rotation. A spring clip device 79 is snapped into a circular groove of sleeve 69 and engages the end of sleeve 67 to hold sleeve 67 from movement axially of sleeve 69. The sleeve 67 has a ring or collar 81 with trunnions 83 to engage the forked ends of lever 41. The weights are normally in their full line position shown by Fig. 1. The spring 63 is substantially flat and the sleeve assembly engages flange 32. When the weights rock under the influence of centrifugal force to the dotted line position they do so about a center substantially above the spring 63 and against the resistance of the spring 63 which is deflected to a conical form. When the weights so rock, the pins 53 are carried with them, moving radially in opening 49, the sleeve 67 slides toward the left and the lever is rocked by the collar 81 and trunnions 83 in a clockwise direction. Connections, of which link 45 only is shown, serve to shift the rollers to higher driving ratio positions. The axial adjustment of sleeve 67 relative to sleeve 69 is intended to be such as to give a predetermined preload to the spring. At maximum speed the flyweights come to rest against the rim 47 as shown by dotted lines. There is but a minimum clearance between the spring and the rim 47. This serves to center the assembly, which function is also obtained by the spline action of the pins and the friction between the weights and springs.

The invention may be embodied in other forms. Fig. 4 shows one such form. In this figure, 27 is the driving shaft with its flange 32 and the barrel member 33 with its flange 31 are like the corresponding parts of Fig. 1. At 147 is a modified form of the rim 47 of Fig. 1. It pivots directly the flyweights 151 by means of a socket 91 engaging a rounded part of the rim 147. At 93 is a rigid pin secured to and extending from the flyweight and engaging a sliding sleeve 95 which functions to operate a lever, not shown, as in Fig. 1. The spring engages pads 59 and hooks 61 formed on the flywheel, these parts 59 and 61 being substantially as shown by Fig. 3. The operation is like that of the form previously described except that the center of movement of the flyweight is about the definitely located fulcrum 91. In this case the limit of flywheel movement may be a stop 92.

Figure 5:
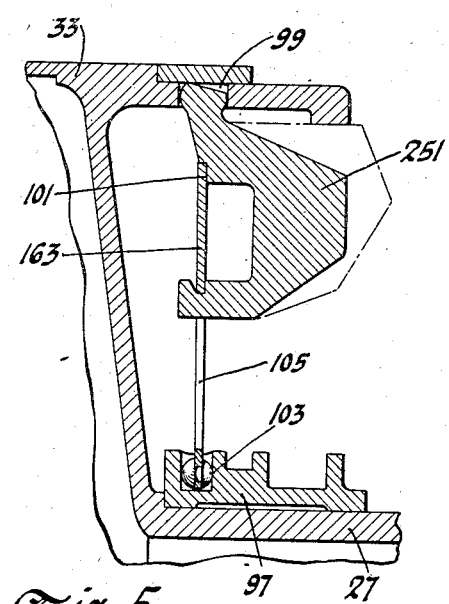
Figure 6:
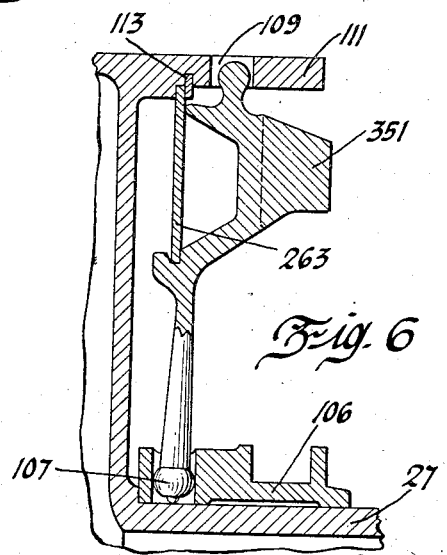

In Fig. 5 the driving member for the driving race is represented by numeral 33 as before and numeral 27 is the tubular input shaft. Slidable axially of the input shaft is sleeve 97. At 251 is the flyweight. It is socketed in an opening 99 in the driving member. The disc spring 163 in this case is in engagement with surfaces of the flyweight as at 101 and is also engaged with the sleeve 97 as at 103 to reciprocate the same to make driving ratio changes. The spring 163 has a slot as at 105 the upper margin of the slot being engaged by the hooks on the weights as shown by the drawing. When the flyweights rock, as shown by dotted lines, the spring is deflected and its portion engaging the sleeve slides the latter as will be understood. The driving member is shown as a stop for the weight in its extreme dotted line position. In Fig. 6 the sleeve 106 is engaged by a rigid end 107 of a flyweight 351. The driving member 27 serves to operate the equivalent of the races and rollers as in Fig. 1. The flyweight in this case is loosely received but guided in a slot 109 in a part 111 rigid with the driving member. The reaction on part 111 is taken by the spring 263 which is anchored as at 113 and is engaged by the hooks of the flyweight as before.

Such a governor will be seen to be simple and compact. The spring is made by stamping and the weights are duplicates whereby the cost is reduced materially. The hooking of the flyweights to the spring forms a pivoting axis without pivot pins. The absence of highly loaded pivot pins result in greatly reduced friction. The whole device makes a rugged assembly. The spring serves to act as an equalizer among the several flyweights. In the preferred embodiment the spring acts as a flyweight retainer except at maximum speed. It is believed that a solid disc spring is preferable. The invention makes possible such a spring either initially flat or dished. With an initially flat spring the curve showing the ratio of sleeve travel to speed will approach a straight line. A spring of laminated form may be used if desired, but such a construction will introduce friction. The use of such a spring with its known characteristics of a non-uniform rate makes possible unequal rates of shift for progressive movements of the weights.

I claim:

1. In a governor, a resilient annulus, flyweights operatively connected to the inner periphery of said annulus and mounted to move under the influence of centrifugal force and thereby to move said inner periphery, means to restrain the outer periphery of said annulus from movement to an extent commensurate with the movement imparted to the inner periphery by said flyweights.

2. In a governor, a resilient annulus, a plurality of flyweights arranged in circular formation, each flyweight being operably connected to the inner periphery of said annulus and mounted to move under the influence of centrifugal force and thereby to move said inner periphery, means to restrain the outer periphery of said annulus from movement to an extent commensurate with the movement imparted to the inner periphery by said flyweights.

3. In a governor, a resilient annulus, a rim surrounding said annulus, a circular series of weights, each weight operatively engaged with the inner periphery of said annulus and in contact relation with the outer periphery of said annulus, a pin extending freely through each weight, the outer end of each pin located in an aperture of said rim, means engaged by the inner ends of said pins and movable by said pins when the weights move under the influence of centrifugal force and against the resilient resistance resulting from the deflection of said annulus.

4. The invention defined by claim 3, the annulus being positioned with its outer periphery closely adjacent said rim to approximately center the assembly.

5. The invention defined by claim 3, the operative engagement between the annulus and weights including a hook formation on said weights.

6. The invention defined by claim 3, said last-named means comprising an outer ring having apertures to receive the inner ends of said pins and an inner concentric ring provided with cam grooves, whereby relative rotation of said rings function as described to facilitate the assembly of said annulus and weights.

7. In a governor, a plurality of centrifugal weights, abutment means for said weights, yielding means operably engaging said weights to resist their motion, said yielding means also operable to equalize the movements of said weights, said yielding means being a spring annulus and the weights engaging said annulus along its inner periphery and mounted to move under the influence of centrifugal force and thereby to move said inner periphery, means to restrain the outer periphery of said annulus from movement to an extent commensurate with the movement imparted to the inner periphery by said flyweights.

8. In a governor, centrifugally operated weights, a spring annulus, a fixed pivot anchorage for said weights, said weights operably connected to the inner periphery of said annulus, radial arms carried by said weights and axially slidable means operably connected to said arms.

9. In a governor, a plurality of weights, abutment means to engage the outer region of said weights, a sliding sleeve, a yieldable annulus in contact with said weights at its outer periphery and with said sleeve at its inner periphery, said annulus provided with slots and said weights engaging the walls of said slots.

10. In a governor, a rotatable driving member, flyweights, a slidable sleeve, said weights operably connected to said sleeve and mounted to move under the influence of centrifugal force, a yielding annulus anchored at its outer periphery to said driving member and engaged at its inner periphery by said weights.

11. The invention defined by claim 10, said driving member being slotted to receive and guide said weights.

JOHN O. ALMEN.